United States Patent
Voth

(10) Patent No.: US 8,678,172 B2
(45) Date of Patent: Mar. 25, 2014

(54) ROTARY DEVICE FOR THE TRANSPORT OF ARTICLES

(75) Inventor: Klaus Voth, Obertraubling (DE)

(73) Assignee: Krones AG, Neutraubling (DE)

( * ) Notice: Subject to any disclaimer, the term of this patent is extended or adjusted under 35 U.S.C. 154(b) by 245 days.

(21) Appl. No.: 13/068,615

(22) Filed: May 16, 2011

(65) Prior Publication Data

US 2011/0278134 A1    Nov. 17, 2011

(30) Foreign Application Priority Data

May 17, 2010   (DE) .......................... 10 2010 020 724

(51) Int. Cl.
*B65G 47/86* (2006.01)

(52) U.S. Cl.
USPC .................. 198/478.1; 198/459.2; 198/460.1; 198/470.1

(58) Field of Classification Search
USPC ...................... 198/459.2, 460.1, 470.1, 478.1
See application file for complete search history.

(56) References Cited

U.S. PATENT DOCUMENTS

| | | | | |
|---|---|---|---|---|
| 4,563,935 A | * | 1/1986 | Rinck et al. ........................ | 86/17 |
| 5,683,729 A | | 11/1997 | Valles ............................ | 425/526 |
| 5,839,568 A | * | 11/1998 | Clark ........................... | 198/750.5 |
| 6,213,309 B1 | * | 4/2001 | Dadisho ........................ | 209/523 |
| 6,354,427 B1 | * | 3/2002 | Pickel et al. ................ | 198/470.1 |
| 7,438,192 B1 | | 10/2008 | Kohler et al. .................. | 209/523 |
| 7,748,518 B2 | | 7/2010 | Hoellriegl et al. ......... | 198/470.1 |
| 2005/0230221 A1 | * | 10/2005 | Guglielmo et al. ........ | 198/459.2 |

FOREIGN PATENT DOCUMENTS

| | | |
|---|---|---|
| DE | 69 40 6298 T3 | 3/1998 |
| DE | 199 06 438 A1 | 8/2000 |
| DE | 199 28 325 A1 | 12/2000 |
| DE | 10 2006 023 531 A1 | 11/2007 |
| DE | 10 2008 013380 A1 | 9/2009 |
| EP | 1 970 329 A1 | 9/2008 |
| WO | WO 98 22374 A1 | 5/1998 |
| WO | WO 2006/050935 A1 | 9/2009 |
| WO | WO 2010/013211 A2 | 2/2010 |

* cited by examiner

*Primary Examiner* — Gene Crawford
*Assistant Examiner* — Matthew Marotta
(74) *Attorney, Agent, or Firm* — Davidson, Davidson & Kappel, LLC

(57) ABSTRACT

A rotary device (10), especially a transfer star, for the transport of articles (15) from a first processing device (1) to a second processing device (5). The rotary device (10) includes a plurality of gripping devices (60) for gripping and holding of articles (15) that are preferably electronically controlled. The distance between the articles (15) in the first processing device (1), e.g. in a heating unit, is different from the distance between the articles (15) in the second processing device (5), e.g. a blow molding device. An electronic control device (30) is located on top of the rotary device (10). This control device (30) controls the distance between the articles (15) fed into the second processing device (5). A method is also provided.

9 Claims, 3 Drawing Sheets

ROTARY DEVICE FOR THE TRANSPORT OF ARTICLES

This claims the benefit of German Patent Application DE 10 2010 020 724, filed May 17, 2010 and hereby incorporated by reference herein.

The present invention relates to a rotary device and a method for the transport of articles from a first processing device to a second processing device, whereby the distance between articles in the first processing device is different from the distance between articles in the second processing device and whereby the device comprises a plurality of gripping devices for gripping and holding the articles. The gripping devices are electronically controlled.

BACKGROUND

Preforms are blow molded to produce containers out of a thermoplastic material in a desired shape. The preforms are first thermally conditioned along a transport route in a heating unit. Particularly the preforms are first heated before the subsequent blow molding process is performed. During the blow molding process the preforms are transformed into containers of the desired shape by compressed air.

The distance between the preforms coming out of the heating unit is usually quite small. The preforms are then usually handed over to the subsequently arranged blow molding device by a transfer star or a delivery star. The distance between the preforms has to be enlarged before the blow molding process according to the size and distance of the blow molds.

This is usually done by moving the preform holding clamps in a radial and tangential direction away from each other.

Document WO 2006/050935 discloses a method and a device for the transport of containers that comprise a carrying ring or something alike. Hereby the radial control of the gripping elements is done by a hydraulic or pneumatic device.

DE 10 2006 023 531 A 1 shows a device for the transport of piece goods with a rotary carrier device and a plurality of transport arms, which are swivel mounted on the carrier device. The movement of the at least one carrier arm is independently controlled from the movement of another transport arm.

WO 1998 022374 A1 shows a servo driven, computer controlled transfer system for containers. The system replaces known transfer stars and is able to transport a plurality of containers with different sizes. Because of the servo driven gripping mechanism and the control by a computer this is a so called "intelligent" system. The gripping arms are moved by servo motors, allowing a secure grip of the containers.

SUMMARY OF THE INVENTION

An object of the present invention is to provide a space efficient transfer device whereby the distances between the transported articles can be adjusted easily.

The present invention provides a rotary device, especially a transfer star, for the transport of articles from a first processing device to a second processing device. Such a transfer star can be used for the transport of preforms from a heating unit to a blow molding device, where the preforms are transformed into the containers.

The rotary device comprises a plurality of gripping devices for gripping and holding the articles. The gripping devices grasp the articles in a certain section. The gripping devices can be gripping clamps, gripping claws or something alike, that grab the articles, for instance preforms or bottles, especially in their neck region, preferably below a carrying ring. The gripping devices are preferably electronically controlled.

The distance between the articles in the first processing device, e.g. in a heating unit, is different from the distance between the articles in the second processing device, e.g. a blow molding device. Usually the distance between the articles fed into the blow molding device is bigger than the distance between the articles in the heating unit.

According to the present invention an electronic control device is located on top of the rotary device. This control device controls the distance between the articles fed into the second processing device. The control device especially controls servo motors that change the distances between the gripping devices on the rotary device.

According to a preferred embodiment the control device regulates the speed of rotation which is used to run the rotary device.

According to another preferred embodiment at least one rotary distributor is arranged on top of the rotary device. This comprises for instance means for the transmission of electrical signals. These means are preferentially means for wireless signal transmission, e.g. via WLAN. The rotary distributor can furthermore comprise means for power supply. Again these means can be wireless, e.g. via an inductive power transmission. Hereby the electrical energy is transmitted without contacts from a fixed conductor to one or more mobile consumers. The rotary distributor can additionally comprise means for the distribution of gaseous and/or liquid media. This allows for instance the use of sterile air or the like to blow out and thereby sterilize the preforms.

According to a preferred embodiment the control device is splash water protected, so that the device can be cleaned easily.

Because the control device for the regulation of the distances is arranged on top of the rotary device and not within the second processing device—especially a blow molding device—a very compact and space saving design is possible.

The invention furthermore relates to a method for the transfer of articles from a first processing device to a second processing device, whereby the distance between articles in the first processing device is different from the distance between articles in the second processing device. The transfer of the articles is done by a rotary device that comprises a plurality of gripping devices for gripping and holding the articles, whereby the gripping devices are electronically controlled. According to the invention the electronic control of the gripping devices and/or the electronic control of the distance between the articles are done by an electronic control device that is located on top of the rotary device.

According to a preferred embodiment the control device regulates the speed of rotation which is used to run the rotary device.

According to one embodiment pre-heated preforms are removed from a heating unit by a first rotary device. The preforms are then handed over to a blow molding device by the first rotary device. The distances between the preforms are adjusted by the first rotary device during the delivery of the preforms to the blow molding device. The distances between the preforms are especially enlarged.

The preforms are converted into containers, especially into bottles, by the blow molding device. The blow molded containers are removed from the blow molding device by a second rotary device. Preferentially the first and the second rotary device are run with the same speed of rotation.

The control of the rotary device is preferentially connected to the machine control, allowing a simple joint coordination.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

Figure 1:
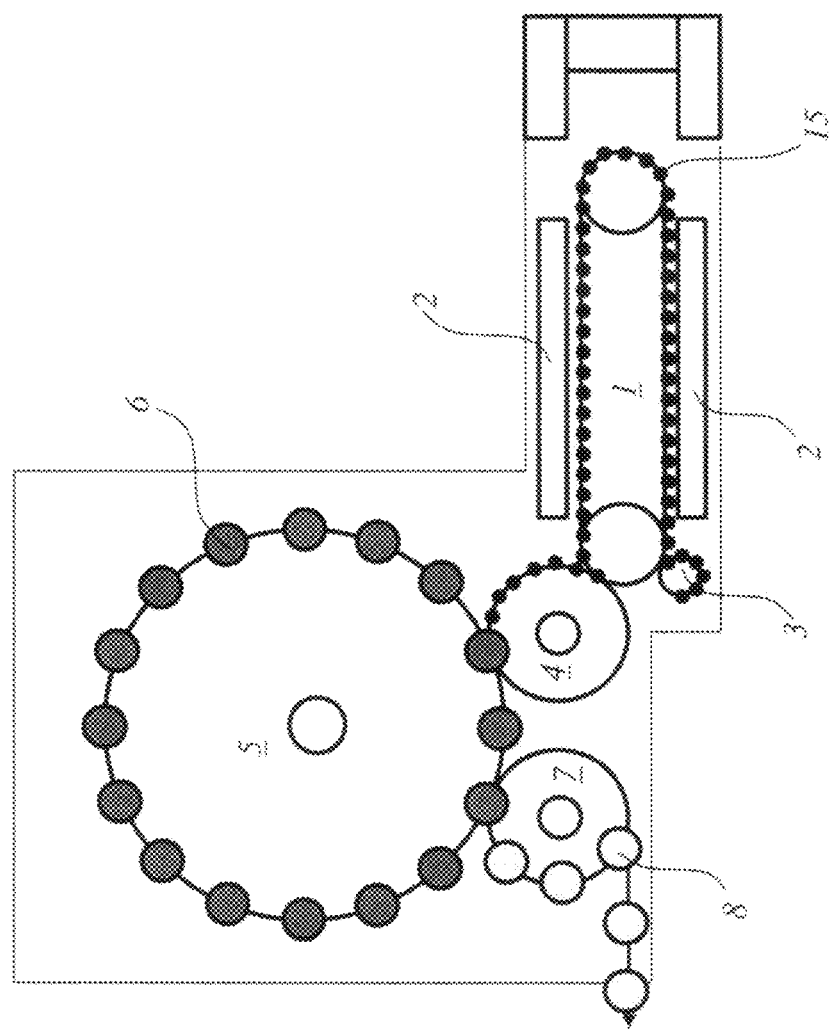
FIG. 1 schematically illustrates the arrangement of a transfer star between two processing devices.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

FIG. 1 schematically illustrates the arrangement of a transfer star 4 between two processing devices 1, 5.

Preforms 15 are fed into a heating unit 1 by an infeed star 3. IR emitters are arranged in heating alleys to bring the preforms 15 to the temperature required for the subsequent conversion into containers 8 in the blow molding device 5.

Preforms 15 are taken out of the heating unit 1 by a transfer star 4 and handed over to the blow molding device 5. The distance between the preforms 15 in the heating unit 1 is usually smaller than the distance between the preforms 15 in the blow molds 6 of the blow molding device 5. Therefore the distance between the preforms 15 has to be adjusted, especially enlarged, according to the size and distance of the utilized blow molds 6. This is usually done by a control device that is associated with the blow molding device 5.

The blow molded containers 8 are then removed from the blow molding device 5 by a discharge star 7 and handed over to further processing devices.

Figure 2:
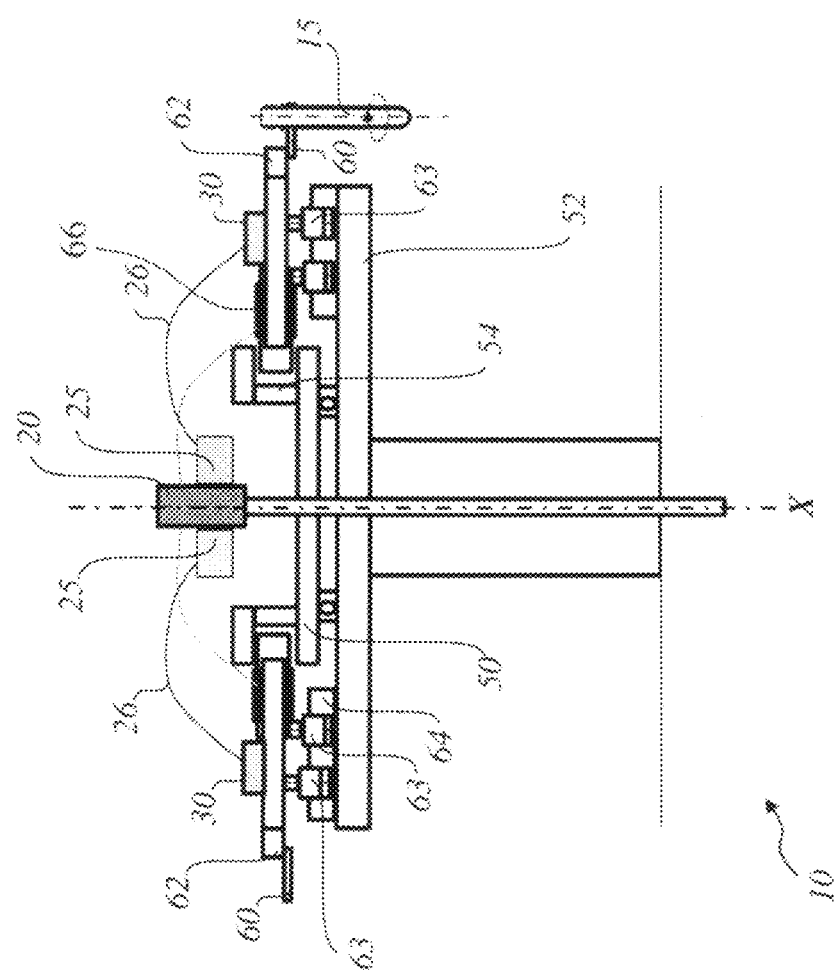
FIG. 2 illustrates a first embodiment of a transfer star with a control device arranged on top.

FIG. 2 illustrates a first embodiment of a transfer star 10 with a first rotary distributor 20 and at least one control device or controller 30 arranged on top of the transfer star 10.

The transfer star 10 comprises a rotary table 50 that is movably supported on a table 52, and can be rotated for example by a separate drive. The drive may be controlled for example by the controller 30. A vertical rotary axis X runs through the center point of the table 52. Transfer arms 62 with gripping devices 60 are arranged on the rotary table 50. The transfer arms are movable on the table 52 by rollers 63 and movable on the rotary table 50 by a bearing 54.

The gripping devices 60 are required for holding the transported articles. According to the embodiment represented in the drawing, preforms 15 are held and transported. The gripping devices show a desired, non uniform motion sequence that is produced by means of a curved disc or cam 64, although use of servomotors 66 for opening or closing the grippers is also possible.

The control of the transfer arms 62 is performed by the control device 30, whereby each transfer arm 62 is associated with the control unit 30. The control unit 30 can furthermore control the gripping motion of the gripping arms of the gripping devices 60. Especially the control unit 30 can adjust the width of the gripping arms according to the transported articles; the width of the gripping arms can especially be adjusted according to the diameter of the preforms 15.

A first rotary distributor 20 is arranged on the central rotation axis X. Another electrical (rotary) distributor 25 for electrical supply of the control device 30 is also arranged on the central rotation axis X.

The rotary distributor 20 for example comprises for instance means for power supply. According to a preferred embodiment these means can be transmitted wireless. This is done, for example, via inductive power transmission, whereby the electrical energy is transmitted without contacts from a fixed conductor to one or more mobile consumers.

Alternatively or additionally the rotary distributor 20 can comprise means for the distribution of gaseous and/or liquid media. This allows for example the use of sterile air or the like to blow out and thereby sterilize the preforms 15 before the blow molding process.

In the shown embodiment the electrical signals are transmitted from the electrical (rotary) distributor 25 to the control device 30 via supply line 26. Alternatively the electrical signals can be transmitted wireless.

Figure 3:
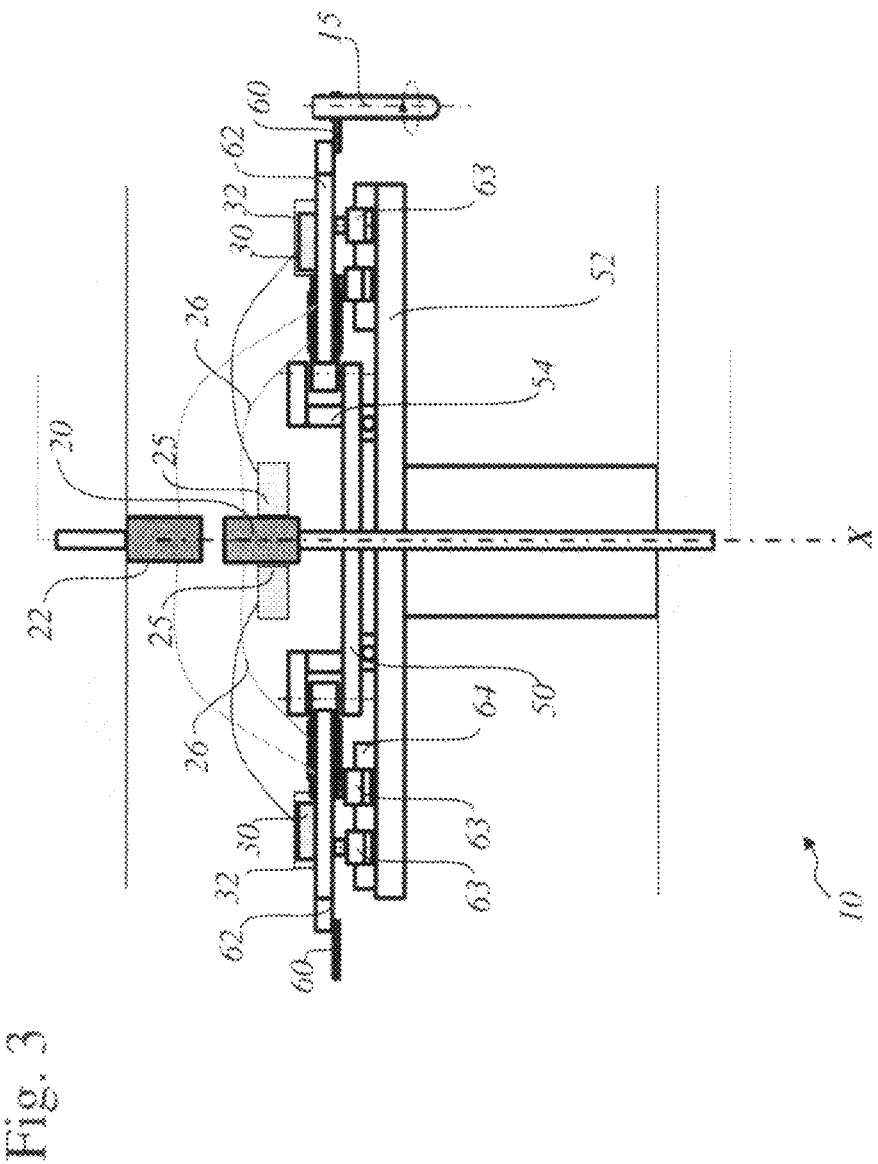
FIG. 3 illustrates a second embodiment of a transfer star with a control device arranged on top.

FIG. 3 illustrates a second embodiment of a transfer star 10 with a first rotary distributor 20, a second rotary distributor 22 and with a control device 30 arranged on top of the transfer star 10. The control device 30 is splash water protected by a special housing 32, so that the device 30 can be cleaned easily.

This embodiment shows an additional second rotary distributor 22 that is arranged on top of the first rotary distributor 20. Thereby a supply with one or more of the already described means is possible, especially with means for power supply and signal transmission and with means for the distribution of gaseous and/or liquid media.

The invention was especially described in reference to a heating unit 1 and a blow molding device 5 for blow molding plastic preforms 15 into plastic containers 8. However it should be noted, that a transfer star 10 according to the invention can also be used for the transfer of containers 8 between other processing devices, e.g. filling devices for containers, sterilization devices for containers and the like.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE NUMBERS 1 heating unit
2 heating alley
3 infeed star
4 transfer star
5 blow molding device
6 blow mold
7 discharge star
8 container
10 transfer star
15 Perform
20 first rotary distributor
22 second rotary distributor
25 electrical distributor
26 cable/supply
30 control device or controller 32 Housing
50 rotary table
52 Table
54 Bearing
60 gripping device
62 transfer arm
63 Roller
64 curved disc
66 Servomotor
X rotation axis

What is claimed is:

1. A rotary device for the transport of articles from a first processing device to a second processing device, comprising:
a plurality of transfer arms each with a gripping device, the gripping devices for gripping and holding the articles, the gripping devices being electronically controlled, so that a distance between the articles in the first processing device is different from a distance of the articles fed into the second processing device by the rotary device;
servo motors assigned to the transfer arms; and
an electronic control device disposed on top of each transfer arm of the plurality of transfer arms; the distance of the articles fed into the second processing device being controlled by the control devices, and the gripping device of each transfer arm being controlled by at least one of the servomotors and the control device associated with the transfer arm, a distance between the gripping devices being changeable.

2. The rotary device as recited in claim 1 further comprising at least one rotary distributor is arranged at a top of the rotary device.

3. The rotary device as recited in claim 2 wherein the at least one rotary distributor distributes electrical signals and/or power and/or gaseous and/or liquid media.

4. The rotary device as recited in claim 1 wherein the controller is splash water protected.

5. The rotary device as recited in claim 1 wherein the rotary device is a transfer star.

6. A method for transfer of articles from a first processing device to a second processing device, a distance between the articles in the first processing device being different from the distance between articles in the second processing device, the method comprising:
transferring the articles from the first processing device to a second processing device by a rotary device for the transport of articles, the rotary device comprising a plurality of transfer arms with gripping devices for gripping and holding of articles and servomotors, the gripping devices being electronically controlled, an electronic control device disposed on top of each transfer arm of the plurality of transfer arms;
controlling the servomotors via the control devices so that a distance between the gripping devices is changeable, thus controlling a distance between the articles in the rotary device, via respective control devices of the respective transfer arms.

7. The method as recited in claim 6 wherein at least one of the control devices regulates the speed of rotation used to run the rotary device.

8. The rotary device as recited in claim 1 wherein a width of gripping arms of the gripping devices is adjustable via each control device of the respective transfer arm.

9. The rotary device as recited in claim 1 wherein the control devices regulate the speed of the rotary device.

* * * * *